United States Patent [19]

Epstein

[11] Patent Number: 5,517,567

[45] Date of Patent: May 14, 1996

[54] KEY DISTRIBUTION SYSTEM

[75] Inventor: Philip Epstein, Warren, N.J.

[73] Assignee: DAQ Electronics Inc., Piscataway, N.J.

[21] Appl. No.: 294,626

[22] Filed: Aug. 23, 1994

[51] Int. Cl.$^6$ .................... H04L 9/08; H04L 9/32
[52] U.S. Cl. ............................ 380/21; 380/23
[58] Field of Search .................... 380/21, 23

[56] References Cited

U.S. PATENT DOCUMENTS

| | | |
|---|---|---|
| 4,731,840 | 3/1988 | Mniszewski et al. . |
| 4,850,017 | 7/1989 | Matyas, Jr. et al. . |
| 4,864,615 | 9/1989 | Bennett et al. ............ 380/21 |
| 4,876,716 | 10/1989 | Okamoto . |
| 4,933,971 | 6/1990 | Bestock et al. . |
| 4,944,007 | 7/1990 | Austin . |
| 5,029,207 | 7/1991 | Gammie . |
| 5,124,117 | 6/1992 | Tatebayashi et al. . |
| 5,136,642 | 8/1992 | Kawamura et al. . |
| 5,144,667 | 9/1992 | Pogue, Jr. et al. . |
| 5,146,497 | 9/1992 | Bright . |
| 5,146,498 | 9/1992 | Smith . |
| 5,150,408 | 9/1992 | Bright . |
| 5,159,633 | 10/1992 | Nakamura . |
| 5,164,986 | 11/1992 | Bright . |
| 5,173,938 | 12/1992 | Steinbrenner et al. . |
| 5,177,791 | 1/1993 | Yeh et al. . |
| 5,202,922 | 4/1993 | Iijima ...................... 380/21 X |
| 5,319,710 | 6/1994 | Atalla et al. ............... 380/23 |
| 5,392,356 | 2/1995 | Konno et al. .............. 380/23 |

Primary Examiner—Gilberto Barrón, Jr.
Attorney, Agent, or Firm—Lerner, David, Littenberg, Krumholz & Mentlik

[57] ABSTRACT

A system for securely distributing a communications key from a master unit to a remote unit for use in cryptographic communications between the master and remote units employs first and second secret numbers stored in both the master and remote units, and a random number generated in the master unit which is combined with the first secret number to produce a first intermediate number which is in turn combined with the second secret number to produce a second intermediate number. The second intermediate number is combined with the communications key to produce a transmission number sent with the random number to the remote unit. The remote unit, using the random number, the transmission number, and the first and second secret numbers, is able to reproduce the communications key. A method for securely distributing the communications key from the master unit to the remote unit is also provided along with a system and method for authenticating the identity of any one of a plurality of remote units in communication with the master unit, whereby each remote unit stores first and second secret numbers unique to it, all of which secret numbers are also stored in the master unit.

31 Claims, 5 Drawing Sheets

KEY DISTRIBUTION SYSTEM

FIELD OF THE INVENTION

This invention relates to a system and method for securely distributing a communications key from a master system to a remote system for use in cryptographic communications between the master and remote systems.

BACKGROUND OF THE INVENTION

In today's age of communications, the use of cryptography is becoming increasingly important to protect confidential communications between a sender and a receiver transmitted over public or easily accessible communications channels such as telephone lines, satellite links, wireless networks, cellular phone systems, etc. The basic idea of cryptography is to first scramble or encrypt the private message, and then send the encrypted message over the communications channel to the receiver where the message is then decrypted and read. If the encrypted message is intercepted by an unauthorized party and cannot be decrypted, it will be unintelligible.

In key-based encryption systems, the message to be sent is encrypted with a "key" or "communications key" which is a code known only to the sender and receiver and is not known to other unauthorized parties who may try to intercept the encrypted message. If the sender and receiver possess and agree to use the same key, the sender can encrypt the message with the communications key and send the unintelligible, encrypted message over the communications channel to the receiver, who can then decrypt the message using the same communications key used by the sender to encrypt the message.

In 1977, the United States National Bureau of Standards decided on a defined encryption algorithm known as the Data Encryption Standard (DES), which is now the standard for the encryption of certain classes of data. DES encryption is currently used by federal agencies as well as by private companies in areas such as electronic banking and money transfer. DES encryption works with a user-supplied data encryption key with a word length of 56 bits. The encryption key, which must be known by both the sender and receiver of the message, is used to encrypt the message, which then appears as an apparently random sequence of unintelligible bits. Since both the encryption and decryption procedures used with DES are publicly known, maintaining the secrecy of the encryption key is imperative when using any DES encryption system. Today there are commercially available integrated circuits which can implement the DES encryption and decryption procedure.

As with DES encryption, one of the largest problems encountered in any key-based encryption system is the need to keep the key secure. One solution is to frequently update the communications key such that even if one key is recovered by an unauthorized user, a subsequent key change will not allow decryption of subsequent messages. To this end, many different methods of key distribution have been devised.

In one widely-used method of key distribution, a human courier or "trusted friend" can be used to physically distribute new keys to the remote systems on a periodic basis. This method can be problematic, however, if the confidence of the trusted friend is compromised or the key is intercepted along the way by an unauthorized party.

Another type of key distribution system is known as a public key system in which the communications key need not be physically distributed or even agreed on in advance by the sender and receiver. In such a system, User A publishes a public encoding key $E_A$ to all users of the system and keeps private a decoding key $D_A$, whereby $D_A(E_A(M))=M$, where M is the message to be sent, $E_A(M)$ is the encryption of message M, and $D_A(E_A(M))$ is the description of encrypted message M. In such a system, however, User A must not publicly reveal $D_A$ when showing $E_A$, and the decoding key $D_A$ must not be computable from encoding key $E_A$. Using this system, User B, who desires to send a message to User A, can look up the encoding key $E_A$ of User A which is published. User B then uses $E_A$ to encrypt the message to be sent to User A. Upon receipt of the encrypted message, User A can quickly decode the message whereas other users or unauthorized parties who do not possess $D_A$ cannot easily ascertain the message from the published $E_A$. This system is extremely slow, however, when used to send large messages due to its reliance on intensive computations needed to decrypt the message.

Another key distribution system, known as double encryption, is disclosed in U.S. Pat. No. 5,029,207 to Gammie. In this system, an external security module for a television signal decoder is provided in which the key to be sent is encrypted using two secret serial numbers known only to the master and the particular remote subscriber. The key used to descramble the program signal is first encrypted with the secret serial number of the remote unit's replaceable security module, and then encrypted again with the secret serial number of the remote unit's decoder. The decoder then uses its two secret serial numbers to work backwards and decrypt the key, which it then uses to descramble the program signal.

U.S. Pat. No. 5,146,498 to Smith discloses a method of remotely changing the encryption key where an original key is stored in a remote unit, and the master unit sends a signal to effectuate a key change based on operations performed on the original key. The key itself, however, is not sent, but rather the new key is generated as a result of mathematical operations on the original key initiated from a key change command sent from the master unit.

U.S. Pat. No. 4,731,840 to Mniszewski et al. discloses a method for encrypting and sending digital key data using DES encryption. Each remote unit used in the system contains a set of key-encryption keys indexed by a common system. The master unit, upon request from the remote unit, generates a key and encrypts it with a preselected key-encryption key. The encrypted key and an index designator is sent to a remote unit wherein the key is decrypted to reproduce a data encryption key.

Other systems, such as that disclosed in U.S. Pat. No. 5,159,633 to Nakamura, use combined public and secret key encryption systems. In Nakamura, storage information is encrypted with a public key system while real time transmission data such as a video signal is encrypted with a secret key system.

Figure 1:
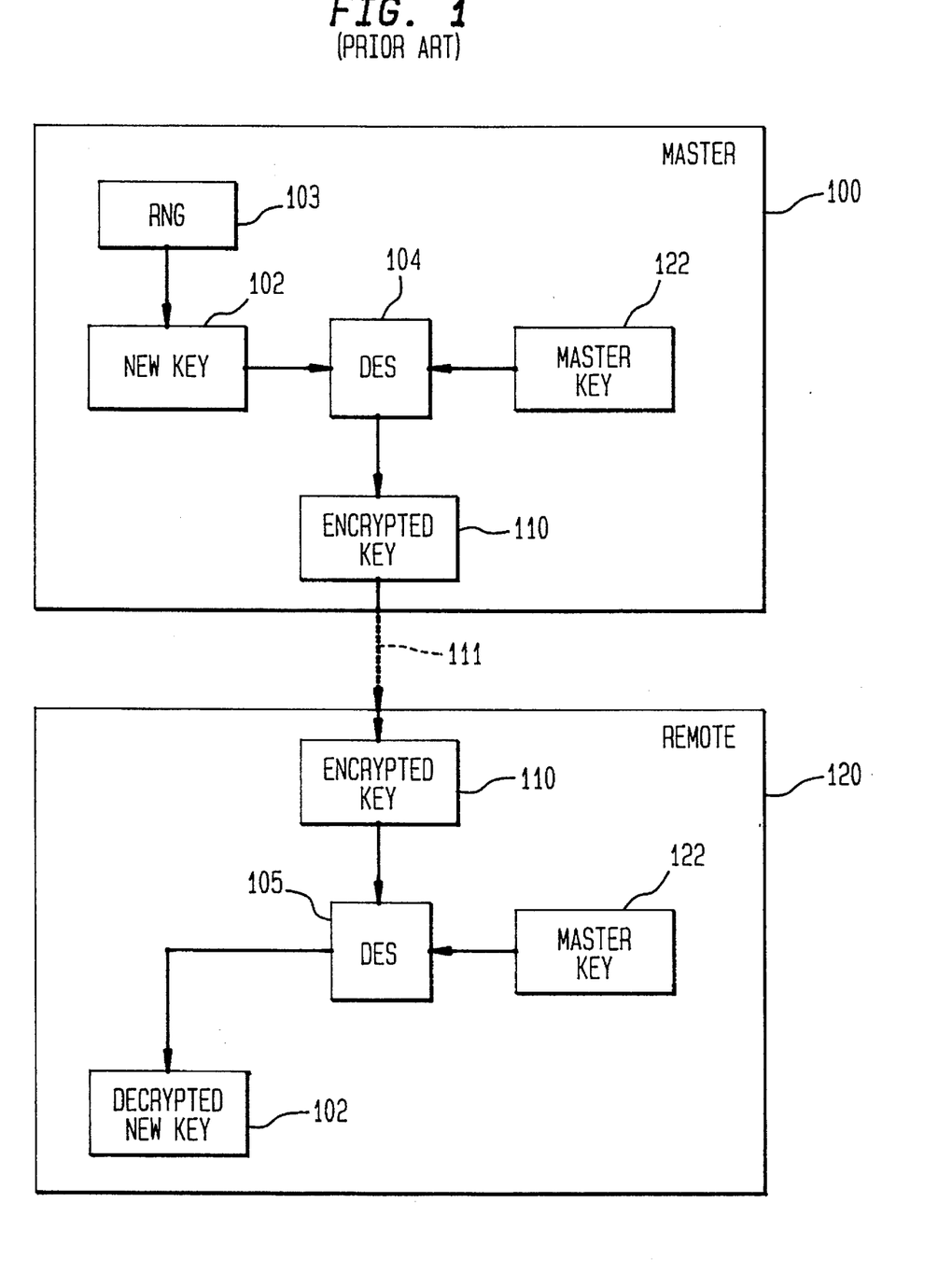
FIG. 1 is an example of a prior art key distribution system.

FIG. 1 shows another example of a prior art key encryption system that includes a central or master unit 100 and a remote unit 120. At master unit 100, a new key 102 is chosen by a random number generator (RNG) 103 to serve as the communications key and must be safely transferred to remote unit 120 over communications channel 111. To this end, master unit 100 generates and then encrypts the new key 102 with a master key 122 of remote unit 120, using DES encryption unit 104 to thereby generate encrypted key 110. Encrypted key 110 is then sent to the remote unit 120 which will then decrypt encrypted key 110 using DES encryption unit 105 and master key 122 to recover new key 102. New key 102 is then used as the new communications key for subsequent communications between master unit 100 and remote unit 120.

This system, however, is subject to attack as follows. First, the attacker intercepts and records the first message sent to remote unit 120 which contains the encrypted key 110. The attacker then records subsequent messages sent encrypted with new key 102. The attacker can then break the code on subsequent messages and recover new key 102. With new key 102 now obtained, the attacker can decrypt the first message and recover master key 122. With knowledge of master key 122, all subsequent messages are vulnerable to interception.

Other data encryption techniques are used by the cellular phone industry to protect not only communications between callers, but to protect the security of identification numbers of remote cellular phones subscribing to the particular system. However, the present systems that attempt to maintain the secrecy of the remote phone's identification number are subject to attack. Currently, when a cellular phone is used, it must first establish initial contact with the base station. When the initial contact is made, the remote cellular phone is then interrogated by the base station in order to obtain the cellular phone's identification number. This identification number is then used by the cellular phone system to invoice the customer for the call. However, attackers can intercept the initial transmission and determine the remote user's identification number, which they can then proceed to install in a cellular phone of their own which can now be used or sold. Calls made from this "imposter" phone will then be billed to the original subscriber. This type of cellular telephone fraud has swamped the phone companies with requests for new telephone numbers and for billing refunds from cellular users, resulting in the loss by the phone companies of significant amounts of money.

Accordingly, in any situation in which communication between a sender and a receiver must be kept confidential, there is a need to provide a key encryption system that is relatively easy to implement and less vulnerable to attack by unauthorized parties. There has been a long felt need to provide such an improved key encryption system which is extremely secure and nearly impossible to break and decrypt subsequent communication keys. There is also a need to provide an improved encryption system that will prevent cellular phone fraud and fraud in similar types of systems by authenticating the identity of the remote unit.

SUMMARY OF THE INVENTION

The present invention meets these above needs. According to one aspect of the present invention, there is provided a method for securely distributing a communications key from a master unit to a remote unit. The method includes the steps of:

(a) storing first and second secret numbers in the master and remote units;

(b) generating a random number and storing the random number in the master unit;

(c) combining the random number with the first secret number to produce a first intermediate number in the master unit;

(d) combining the first intermediate number with the second secret number to produce a second intermediate number in the master unit;

(e) combining the second intermediate number with the communications key to produce a transmission number in the master unit;

(f) transmitting the transmission number and the random number from the master unit to the remote unit;

(g) receiving the transmission number and the random number in the remote unit;

(h) combining the random number with the first secret number to recreate the first intermediate number in the remote unit;

(i) combining the first intermediate number with the second secret number to produce the second intermediate number in the remote unit; and (j) combining the second intermediate number with the transmission number to produce the communications key in the remote unit.

The method preferably includes the step of combining the first intermediate number with the second secret number in the master and remote units by the step of encrypting the first intermediate number using the second secret number as the encrypting key. More preferably, this encrypting step comprises DES encryption.

In preferred methods, the step of combining the random number with the first secret number in the master and remote units includes the step of exclusive OR-ing the random number with the first secret number; the step of combining the second intermediate number with the communications key; in the master unit includes the step of exclusive OR-ing the intermediate number with the communications key; and the step of combining the second intermediate number with the transmission number in the remote system includes the step of exclusive OR-ing the second intermediate number with the transmission number.

Preferably, steps (b) through (j) are repeated on a periodic basis to change the communications key, with a preferred periodic basis being about every hour, or more preferably less than every 15 minutes, or most preferably, every three minutes. The method may also include the step of securely loading the first and second secret numbers from the master system to the remote unit.

The present invention also provides a system for performing the method. A still further aspect of the present invention provides a method for authenticating the identity of a remote unit in a plurality of remote units in communication with a master unit, where the master and remote units have stored therein first and second secret numbers identifying the remote unit. The authenticating method includes the steps of:

(a) storing in each one of the plurality of remote units first and second secret numbers, the first and second secret numbers in one remote unit being different than the first and second secret numbers in any other remote unit;

(b) storing in the master unit the first and second secret numbers of the plurality of the remote units;

(c) establishing initial contact between the master unit and a selected one of the plurality of the remote units;

(d) providing a random number to the master unit;

(e) transmitting the random number from the master unit to the selected remote unit;

(f) processing the random number in the selected remote unit with the first and second secret numbers to generate a remote processed number;

(g) processing the random number in the master unit with the first and second secret numbers to generate a master processed number;

(h) transmitting the remote processed number to the master unit; and (i) comparing the remote processed number and the master processed number in the master unit, wherein the identity of the selected remote unit is authenticated when the remote processed number is equal remote unit is authenticated when the remote processed number is equal to the master processed number.

Preferably, the step of processing the random number in the selected remote unit includes the steps of combining the random number with the first secret number to generate a remote intermediate number and combining the remote intermediate number with the second secret number to generate the remote processed number. Further, the step of processing the random number in the master unit may include the steps of combining the random number with the first secret number to generate a master intermediate number and combining the master intermediate number with the second secret number to generate the master processed number.

The step of combining the random number with the first secret number in the selected remote and master units preferably includes the step of exclusive OR-ing the random number with the first secret number in the master and selected remote units. Also preferably, the remote and master intermediate numbers are combined with the second secret number by an encrypting step using the second secret number as the encrypting key. In a highly preferred method, the encrypting step is conducted using DES encryption.

The step of establishing initial contact may further include the step of transmitting an identification number from the selected remote unit to the master unit and recalling in the master unit the first and second secret numbers associated with that identification number.

DETAILED DESCRIPTION OF THE PREFERRED EMBODIMENTS

Figure 3:
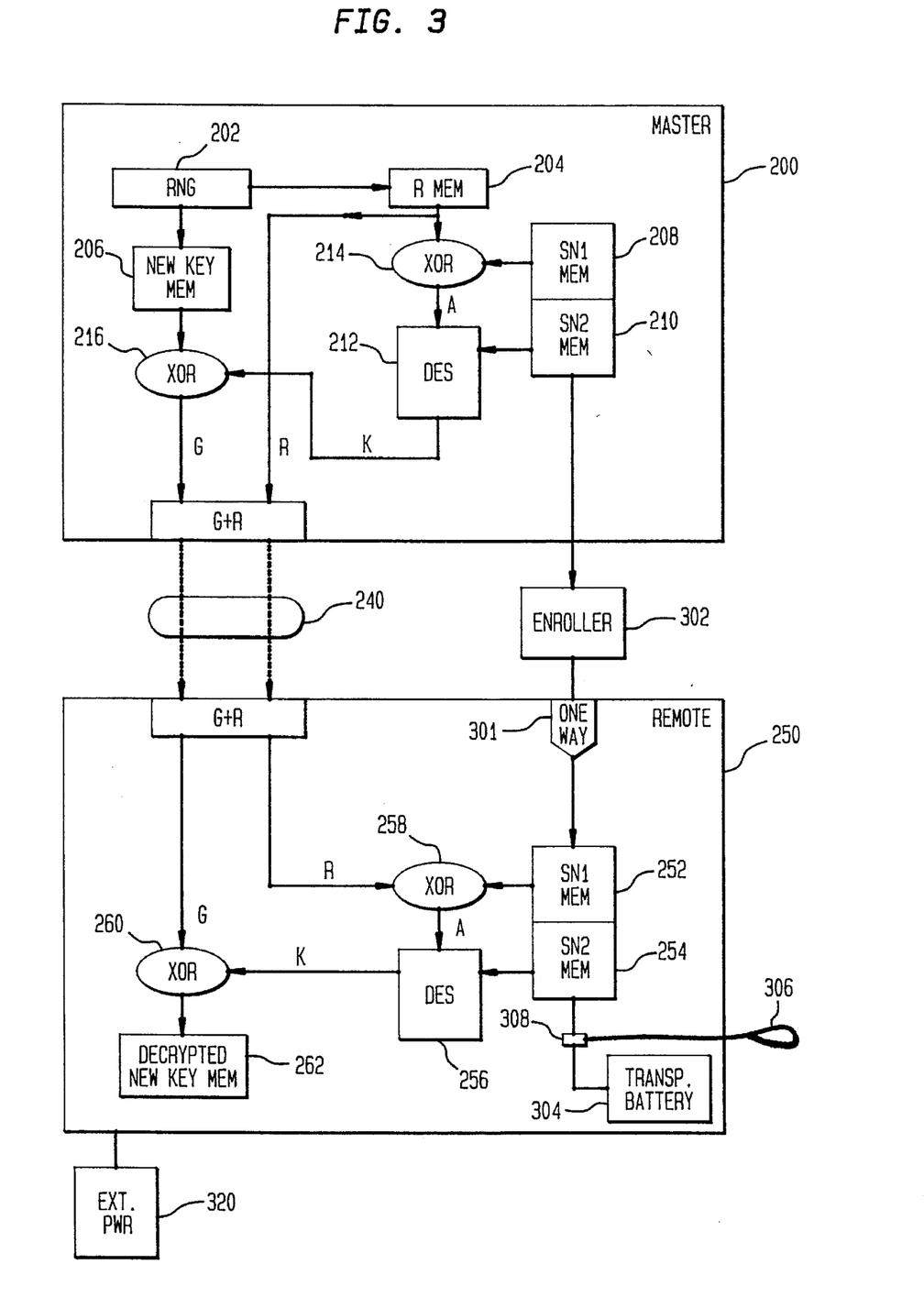
FIG. 3 is a schematic diagram of a key distribution system for performing the method of FIG. 2.

Referring now to FIG. 3, a schematic diagram of a key distribution system in accordance with the present invention is illustrated. The key distribution system includes a master unit 200 and a remote unit 250 which, after installation and set up, are in communication with one another through communications channel 240. Communications channel 240 can comprise many different forms such as regular telephone lines, satellite links, local area networks, free space transmission, etc.

Master unit 200 includes a random number generator (RNG) 202 for generating a random number R, preferably of 8 bytes, which is stored in R memory 204. Random number generator 202 is also used to generate a random number, preferably of 8 bytes, to be used as the new communications key which is stored in new key memory 206. Master unit 200 is further provided with secret number (SN) memories SN1 memory 208 for storing a first secret number SN1, and SN2 memory 210 for storing a second secret number SN2. Secret numbers SN1 and SN2 preferably have a length of 8 bytes each. Master unit 200 also includes a conventional DES encryption unit 212, such as DES unit Am9518 sold by Advanced Micro Devices of Sunnyvale, Calif., and XOR (exclusive-OR) gates 214 and 216. A single XOR gate may also be used in master unit 200 for all necessary XOR operations.

Remote unit 250 of the key distribution system likewise includes SN1 and SN2 memories 252 and 254 for storing first and second secret numbers SN1 and SN2, respectively, conventional DES encryption unit 256, XOR gates 258 and 260 (which can be combined into one gate) and decrypted new key memory 262. Remote unit 250 also includes one way data port 301 connected to SN1 and SN2 memories 252 and 254. Transport battery 304 is also provided within remote unit 250 and is connected to SN1 and SN2 memories 252 and 254. An arming lanyard 306 is connected to node 308 and when released will disengage transport battery 304 from SN1 and SN2 memories 252 and 254. When installed in its intended location, remote unit 250 is powered by external power supply 320.

The operation of the key distribution system shown in FIG. 3 is as follows. Initially, prior to any key changes, remote unit 250 is "enrolled" with its secret number pair SN1 and SN2. Master unit 200 likewise is initially provided with the same two secret numbers SN1 and SN2. To enroll remote unit 250, secret numbers SN1 and SN2 are first loaded in SN1 and SN2 memories 208 and 210, respectively, of master unit 200. Secret numbers SN1 and SN2 may be retrieved from a secret number memory bank (not shown) containing secret number pairs of all remote units used in the system. SN1 and SN2 then may be enrolled into SN1 and SN2 memories 252 and 254 in remote unit 250 before remote unit 250 is taken to the remote site. In order to enroll remote unit 250 with its secret numbers SN1 and SN2, an enroller 302 may be provided to allow SN1 and SN2 to be securely read out from SN1 and SN2 memories 208 and 210 in master unit 200 and into SN1 and SN2 memories 252 and 254 of remote unit 250.

Enroller 302 preferably consists of a cable and plug and connects master unit 200 with remote unit 250 only during the enrolling process. Remote unit 250 is provided with a one-way data transfer port 301, such as an ASCII port used only for enrolling the remote unit 250. One-way transfer port 301 provides additional security by not allowing SN1 and SN2 or any other data to be read out through that port.

After remote unit 250 is enrolled, SN1 and SN2 are stored in SN1 and SN2 memories 252 and 254, which consist of volatile memory. While taking remote unit 250 to its intended remote installation location, volatile SN1 and SN2 memories 252, 254 are temporarily maintained by way of transport battery 304 since remote unit 250 is not yet connected to external power supply 320. Transport battery 304, however, is detachable from memories 252 and 254 by the removal of arming lanyard 306 which breaks the transport battery connection at node 308 once remote unit 250 is securely installed in its remote location and connected to external power supply 320. Thus, once remote unit 250 is installed at its intended remote location and arming lanyard 306 is removed, any attempts to remove remote unit 250 from its installed location will cut off external power supply 320 and will result in the immediate loss of all memory including SN1 and SN2. For further security, remote unit 250 is preferably provided with a tamper-proof housing such that any attempt to physically penetrate remote unit 250 without removing it will also cut off the external power supply and destroy all memory.

Once remote unit 250 is enrolled with SN1 and SN2 and installed in its intended remote location, the new communications key is generated and distributed as follows. In master unit 200, random number generator 202 first generates a new key which is then stored in new key memory 206. Random number generator 202 also generates a random number R which is stored in R memory 204. Random number R and SN1 are then sent to XOR gate 214 and XOR-ed to produce a first intermediate number A. First intermediate number A is then encrypted by DES encryption unit 212 using SN2 as the encryption key, thereby generating a second intermediate number K. Second intermediate number K is then XOR-ed at XOR gate 216 with the new communications key stored in new key memory 206 to generate a transmission number G in master unit 200. Transmission number G is then sent together with random number R over communications channel 240, e.g., over a phone line, satellite link, etc., to remote unit 250.

At remote unit 250, the process is then reversed in order to recreate the new communication key to be used. In this regard, transmission number G and random number R are initially received from master unit 200. Random number R is then XOR-ed with SN1 at XOR gate 258 to recreate first intermediate number A. First intermediate number A is then encrypted at DES encryption unit 256 using secret number SN2 as the encryption key. The result of the encryption operation is the recreation of second intermediate number K, which is then XOR-ed with transmission number G at XOR gate 260 in order to decrypt and recreate the new communications key, which subsequently may be stored in decrypted new key memory 262. Once remote unit 250 has recovered the new communications key, remote unit 250 and master unit 200 may safely communicate with one another other by encrypting messages with the common communications key known only to the master and remote units.

The advantage of this key distribution system lies in the fact that a new communications key can be sent as often as desired from the master unit to the remote unit, and even if an unauthorized party can somehow manage to decipher the particular key in use, knowing that key will not yield the first and second secret numbers SN1 and SN2 which are unique to each remote unit and used in all key changes. As a result, a new key can be distributed with such a high frequency that it would not be useful to attempt to decrypt the key since that key will shortly be changed and thereafter will be useless. Therefore, in order to break the system, a would-be attacker would have to attempt to obtain the two secret numbers. The new key is preferably distributed on a periodic basis about every hour, and more preferably less than every 15 minutes. Most preferably, the new key is distributed about every three minutes.

Assuming that the would-be attacker is even able to determine the second intermediate number K, it is virtually impossible to obtain both secret numbers. Knowing K, the attacker would have to find two numbers (secret numbers SN1 and SN2) such that SN1 XOR-ed with R and then encrypted using SN2 as the key, will yield intermediate number K. The problem is that there are $2^{120}$ possible combinations of which no less than 256 appear to work since SN1 XOR-ed with R and encrypted using SN2 will yield the communications key when tested against the message. However, only one of these 256 combinations is actually correct, and only the correct combination will work with subsequent key changes. Since a new communications key is preferably transmitted every few minutes, it is virtually impossible for the attacker to break the system.

Although FIG. 3 only illustrates a single remote unit, it should be appreciated that multiple remote units may be used in the system, with each remote unit having its own unique secret numbers SN1 and SN2 which can be ascertained in the master unit when the master unit effectuates a key change to each remote unit.

The key encryption system of the present invention is useful not only to protect communications between a sender and a receiver where the primary consideration is concealing the content of the message being sent, but is also extremely useful in security systems where the content of the message is typically known. Such "messages", including card swipes, the opening of doors, etc., must be protected from being aliased, i.e., false messages being sent to deceive the master unit.

Figure 2:
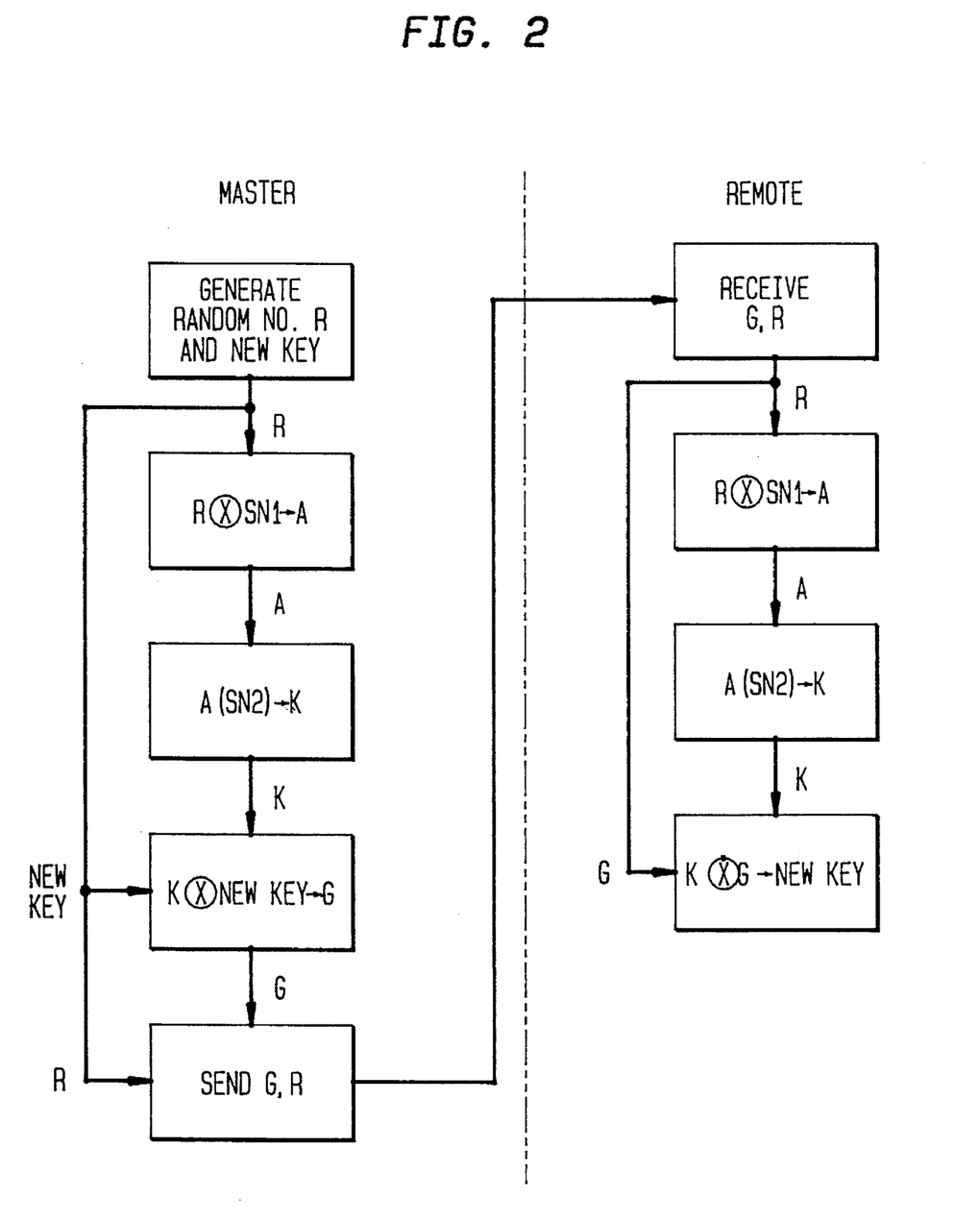
FIG. 2 is a flow chart illustrating a method of key distribution in accordance with one aspect of the present invention.

Referring now to FIG. 2, a flow chart of the method of the present invention is shown. As can be seen, a random number R is first generated in the master unit and then XOR-ed with SN1 to produce first intermediate number A. First intermediate number A is then encrypted with SN2 (by DES encryption) to produce second intermediate number K. Second intermediate K is then XOR-ed with the new key to be sent to produce the transmission number G. The master unit then sends transmission number G and random number R to the remote unit. The remote unit then reverses the sequence by XOR-ing random number R with SN1 to recreate first intermediate number A. First intermediate number A is then encrypted with SN2 (by DES encryption) to produce second intermediate number K. Second intermediate number K is then XOR-ed with transmission number G to recreate the new communications key to be used in subsequent communications. Preferably, a new key is sent out as frequently as necessary, such as every three minutes, other predetermined periodic time intervals such as every 15 minutes or every hour, or even at random time intervals.

Figure 5:
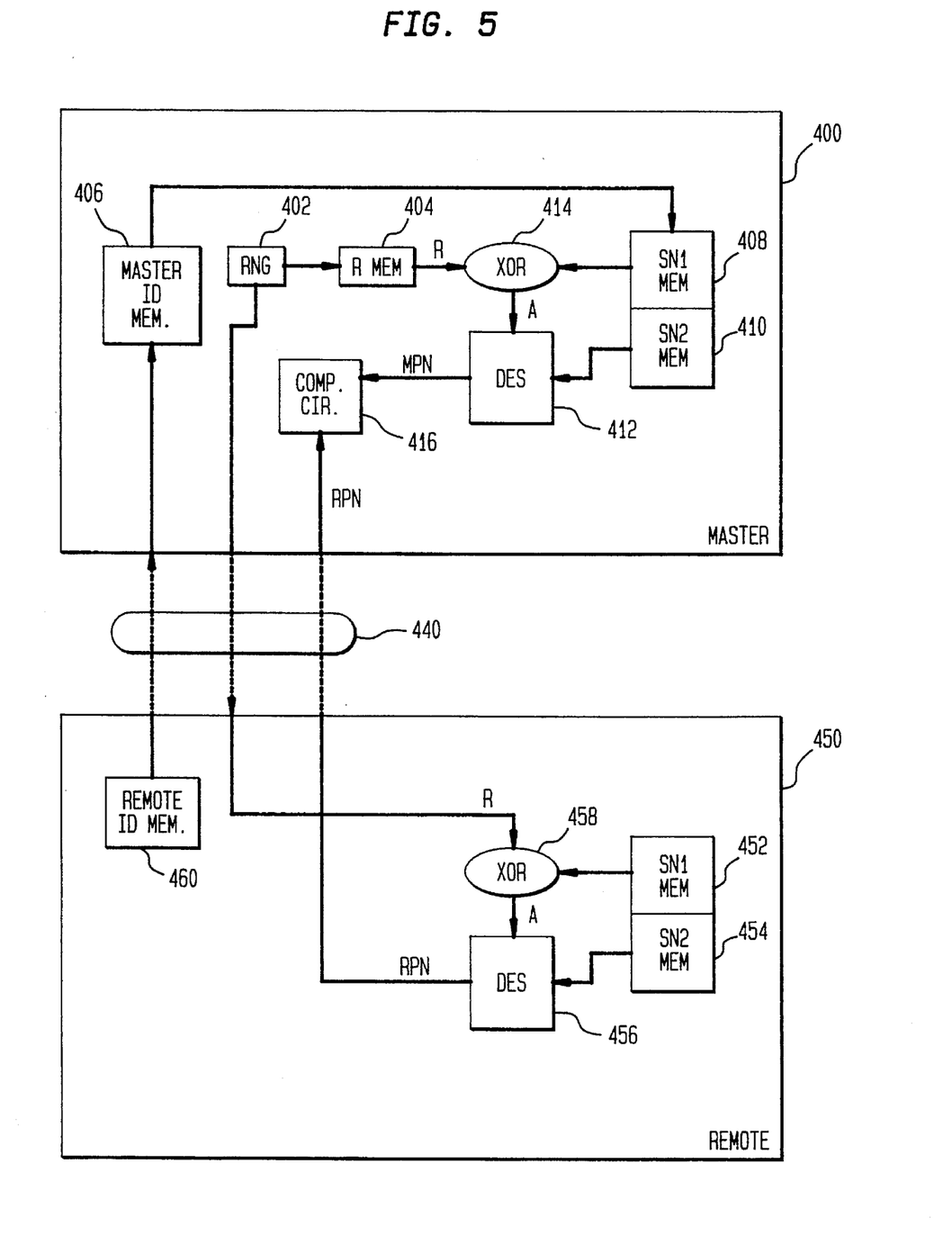
FIG. 5 is a schematic diagram of an authentication system for performing the method of FIG. 4.

Turning now to FIG. 5, a system for authenticating the identity of each remote unit, such as a cellular telephone unit in a system of remote units in communication with a master unit, is shown in schematic form. The identification system includes a master unit 400 and at least one remote unit 450 which are in communication with one another through communication channel 440.

Master unit 400 includes a random number generator 402 for generating a random number R which can be stored in R memory 404. Master unit 400 is further provided with secret number (SN) memories SN1 memory 408 for storing first secret number SN1, and SN2 memory 410 for storing second secret number SN2. Secret number pairs SN1 and SN2 are provided for each remote unit 450, and therefore, master unit 400 can include a master ID memory 406 to store all of the secret numbers SN1 and SN2 for each remote unit in the system. Master unit 400 also includes a conventional DES encryption unit 412, XOR gate 414, and comparison circuit 416 used for comparing a pair of numbers to determine whether they are the same.

Each remote unit of the identification system, such as remote unit 450, includes SN1 and SN2 memories 452 and 454 for storing first and second secret numbers SN1 and SN2, unique to that remote unit respectively. Remote unit 450 also includes a conventional DES encryption unit 456, XOR gate 458 and remote ID memory 460 which stores the unique identification number of the particular remote unit in the system.

The operation of the system shown in FIG. 5 for authenticating the identity of each remote unit in the system is as follows. Master unit 400 is initially provided with all of the pairs of secret numbers, SN1 and SN2, for all of the remote units in the system. These secret numbers are stored in remote ID memory 406. The secret numbers of each remote system may then be enrolled into SN1 and SN2 memories 452 and 454 of each remote unit. In this manner, remote unit 450, for example, can be enrolled with its unique secret numbers SN1 and SN2 as previously explained in the key distribution system of the present invention, i.e., by providing a one way transfer port in remote unit 450 for one way downloading of the secret numbers SN1 and SN2. In addition, remote unit 450 may also be provided with additional security measures as described above in the key distribution system, including volatile memory 452 and 454 maintained only by way of a transport battery, the connection to which can be broken by the use of an arming lanyard or similar device once remote unit 450 is connected to an external power supply, such as a car battery. In this manner, remote unit 450 should also be tamper-proof such that any attempts to ascertain SN1 and SN2 will result in the immediate loss of these numbers from memory.

After remote unit 450 is enrolled with SN1 and SN2 and installed in its intended remote location, initial contact must be established between master unit 400 and remote unit 450. For example, in a cellular phone system, this could be established when the sender of the call from remote unit 450 initially dials and sends a telephone number. With the telephone number, remote unit 450 can send its unique identification number, stored in ID memory 460, which will then be received in master unit 400. Once master unit receives the identification number, it then can look up the secret numbers SN1 and SN2 for remote unit 450 as identified by its unique identification number. With SN1 and SN2 of the remote unit 450, random number generator 402 generates a random number R which is stored in R memory 404. Random number R is then sent from master unit 400 to remote unit 450 in which it is received and XOR-ed with SN1 at XOR gate 458. This XOR operation produces a first intermediate number A which is then encrypted by DES unit 456, using SN2 as the encryption key, to thereby generate a remote processed number RPN.

At the same time, in the master unit 400 the same random number R is likewise XOR-ed with SN1 at XOR gate 414 producing intermediate number A, which is in turn encrypted by DES unit 412 using SN2 as the encryption key. The result is a master processed number MPN. The remote unit 450 then transmits RPN to master unit 400 where it is compared with MPN at comparison circuit 416, such as by the use of one or more XOR gates in order to determine whether they match. If MPN equals RPN, then the remote unit is authenticated and the call is allowed to proceed.

Figure 4:
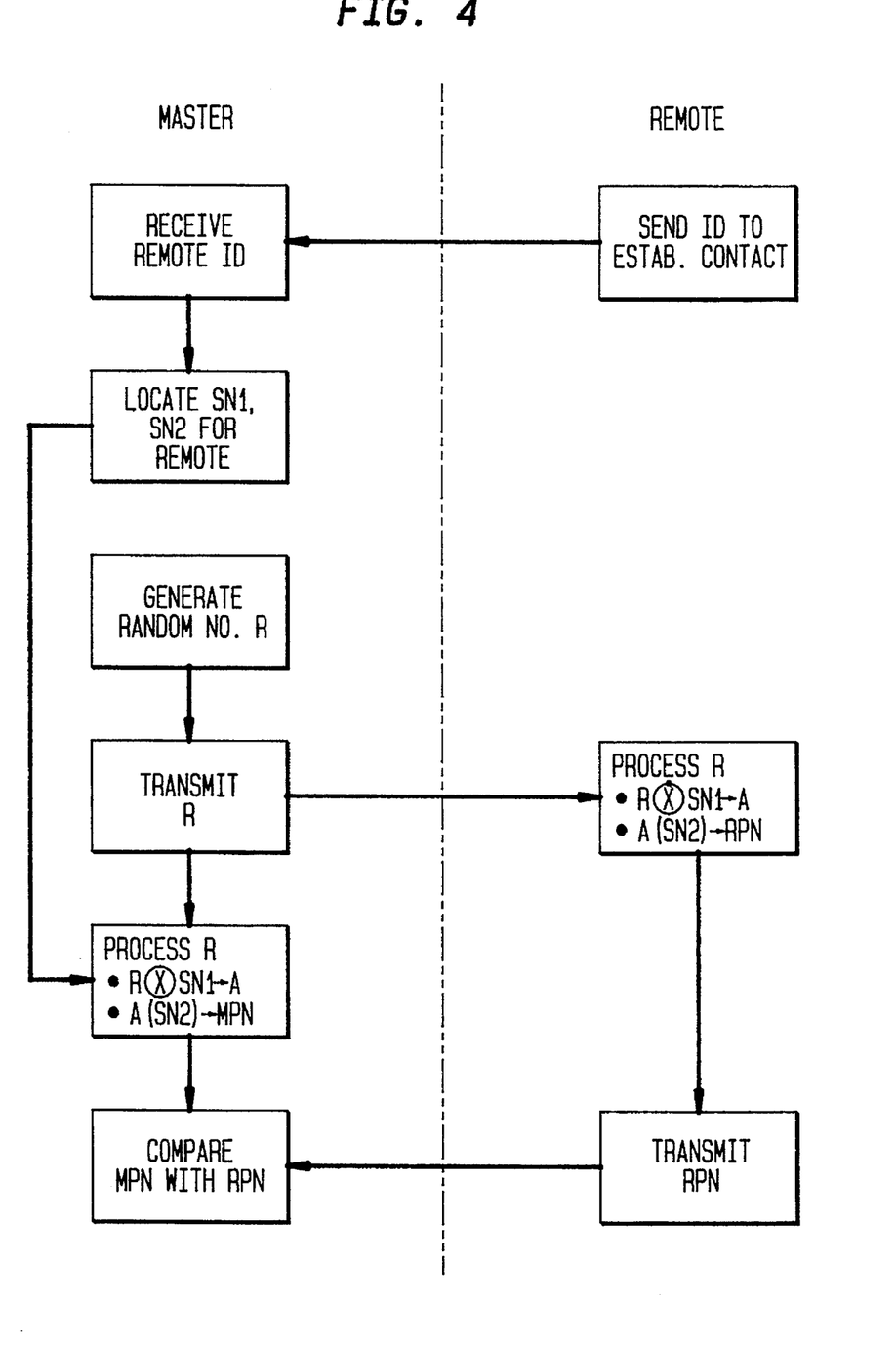
FIG. 4 is a flow chart illustrating a method for authenticating the identity of a remote unit in communication with a master unit in accordance with another aspect of the present invention.

Turning to FIG. 4, a flow chart of the method of authenticating the identity of a remote unit is shown. Thus, initial contact is first established between the master and remote units and the identification number of the remote unit is sent to the master unit. The master unit then uses the identification number to locate SN1 and SN2 for the identified remote unit. Next, a random number R is generated in the master unit which is then transmitted to the remote system. The remote unit, which already has stored first and second secret numbers SN1 and SN2, processes random number R using these secret numbers to generate a remote processed number RPN.

The same processing of the random number R occurs in the master unit using the secret numbers SN1 and SN2 of the identified remote unit. The remote unit then transmits the remote processed number RPN to the master unit where the master processed number MPN is compared to the remote processed number RPN to authenticate the identity of the remote unit. If RPN and MPN match, then the remote unit is authentic since only the remote unit will be able to recreate a remote processed number equal to the master processed number by the use of secret numbers SN1 and SN2.

Preferably, the processing of the random number in both the master and remote units is accomplished by first XOR-ing random number R with SN1 to produce an intermediate number A, although other logical and arithmetic operations may be used, such as multiplication and truncation, so long as the same operation is performed both in the master and remote units, or if different operations are used, so long as the differences in the operations are accounted for in the master and/or remote units. Intermediate number A is, in turn, encrypted using SN2, preferably using DES encryption, to generate the remote and master processed numbers for comparison.

It should be apparent to those of ordinary skill in the art that all of the operations described herein can be carried out under the control of a microprocessor or CPU and using readily available electronic and IC components. Moreover, although DES encryption is preferred for encrypting operations in accordance with the present invention, other encrypting operations can be used, such as matrix, table look-up, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system for securely distributing a communications key from a master unit to a remote unit, comprising:

memory means for storing first and second secret numbers in the master unit;

random number generating means for providing a random number to the master unit;

first combining means in the master unit for combining said random number with said first secret number to produce a first intermediate number;

second combining means in the master unit for combining said first intermediate number with said second secret number to produce a second intermediate number;

third combining means in the master unit for combining said second intermediate number with the communications key to produce a transmission number;

communication means for transmitting signals between the master and remote units;

memory means for storing said first and second secret numbers in the remote unit;

first combining means in the remote unit for combining said random number with said first secret number to produce said first intermediate number;

second combining means in the remote unit for combining said first intermediate number with said second secret number to produce said second intermediate number; and third combining means in the remote unit for combining said intermediate number with said transmission number to produce the communications key.

2. The system as claimed in claim 1, wherein said second combining means in the master unit and said second combining means in the remote unit include encryption means for encrypting said first intermediate number using said second secret number as an encrypting key.

3. The system as claimed in claim 2, wherein said encryption means uses DES encryption.

4. The system as claimed in claim 1, wherein said first combining means in the master unit and said first combining means in the remote unit include means for exclusive OR-ing said random number with said first secret number.

5. The system as claimed in claim 1, wherein said third combining means in the master unit includes means for exclusive OR-ing said second intermediate number with the communications key and said third combining in the remote unit includes means for exclusive OR-ing said second intermediate number with said transmission number.

6. The system as claimed in claim 4, wherein said third combining means in the remote unit includes means for exclusive OR-ing said second intermediate number with said transmission number.

7. The system as claimed in claim 1, further comprising enrolling means for securely copying said first and second secret numbers from the master unit into said memory means in the remote unit.

8. A method for securely distributing a communications key from a master unit to a remote unit, comprising the steps of:
   (a) storing first and second secret numbers in the master and remote units;
   (b) generating a random number and storing said random number in the master unit;
   (c) combining said random number with said first secret number to produce a first intermediate number in the master unit;
   (d) combining said first intermediate number with said second secret number to produce a second intermediate number in the master unit;
   (e) combining said second intermediate number with said communications key to produce a transmission number in the master unit;
   (f) transmitting said transmission number and said random number from the master unit to said the remote unit;
   (g) receiving said transmission number and said random number in the remote unit;
   (h) combining said random number with said first secret number to produce said first intermediate number in the remote unit;
   (i) combining said first intermediate number with said second secret number to produce said second intermediate number in the remote unit; and
   (j) combining said second intermediate number with said transmission number to produce said communications key in the remote unit.

9. The method as claimed in claim 8, wherein said step of combining said first intermediate number with said second secret number in the master and remote units includes the step of encrypting said first intermediate number using said second secret number as an encrypting key.

10. The method as claimed in claim 9, wherein said encrypting step comprises DES encryption.

11. The method as claimed in claim 8, wherein said step of combining said random number with said first secret number in the master and remote units includes the step of exclusive OR-ing said random number with said first secret number.

12. The method as claimed in claim 8, wherein said step of combining said second intermediate number with said communications key in the master unit includes the step of exclusive OR-ing said second intermediate number with said communications key and said step of combining said second intermediate number with said transmission number in the remote unit includes the step of exclusive OR-ing said second intermediate number with said transmission number.

13. The method as claimed in claim 11, wherein said step of combining said second intermediate number with said communications key in the master unit includes the step of exclusive OR-ing said second intermediate number with said communications key and said step of combining said second intermediate number with said transmission number in the remote unit includes the step of exclusive OR-ing said second intermediate number with said transmission number.

14. The method as claimed in claim 8, wherein said steps of (b) through (j) are repeated on a periodic basis to change said communications key.

15. The method as claimed in claim 14, wherein said periodic basis is about every hour.

16. The method as claimed in claim 14, wherein said periodic basis is less than every 15 minutes.

17. The method as claimed in claim 14, wherein said periodic basis is about every three minutes.

18. The method as claimed in claim 8, further including the step of securely copying said first and second secret numbers from the master unit to the remote unit.

19. A method for authenticating the identity of remote unit in a plurality of remote units in communication with a master unit, said method comprising the steps of:
   (a) storing in each one of the plurality of remote units first and second secret numbers, said first and second secret numbers in one remote unit being different than said first and second secret numbers in any other remote unit;
   (b) storing in the master unit said first and second secret numbers of the plurality of the remote units;
   (c) establishing initial contact between the master unit and a selected one of the plurality of remote units;
   (d) providing a random number to the master unit;
   (e) transmitting said random number from the master unit to said selected remote unit;
   (f) processing said random number in said selected remote unit with said first and second secret numbers stored in said selected remote unit to generate a remote processed number;
   (g) processing said random number in the master unit with said first and second secret numbers to generate a master processed number;
   (h) transmitting said remote processed number to the master unit; and
   (i) comparing said remote processed number and said master processed number in the master unit, whereby the identity of said selected remote unit is authenticated when said remote processed number is equal to said master processed number.

20. A method as claimed in claim 19, wherein said step of processing said random number in said selected remote and master units comprises the steps of combining said random number with said first secret number to generate an intermediate number and combining said intermediate number with said second secret number to generate said respective remote and master processed numbers.

21. The method as claimed in claim 20, wherein said step of combining said random number with said first secret number in said selected remote unit and the master unit includes the step of exclusive OR-ing said random number with said first secret number in the master unit and said selected remote unit.

22. A method as claimed in claim 20, wherein said step of combining said intermediate number with said second secret number in the master unit and said selected remote unit includes the step of encrypting said intermediate number using said second secret number as an encrypting key.

23. The method as claimed in claim 22, wherein said encrypting step comprises DES encryption.

24. The method as claimed in claim 19, wherein said step of establishing initial contact comprises the steps of transmitting an identification number from said selected remote unit to the master unit and recalling in the master unit said first and second secret numbers associated with said identification number identifying said selected remote unit.

25. A system for authenticating the identity of a remote unit in a plurality of remote units in communication with a master unit, comprising:

remote memory means for storing in each one of the plurality of remote units first and second secret numbers, said first and second secret numbers in one remote unit being different than said first and second secret numbers in any other remote unit;

master memory means for storing in the master unit said first and second secret numbers of the plurality of the remote units;

contact means for establishing initial communication between the master unit and a selected one of the plurality of said remote units;

random number generating means for providing a random number to the master unit;

communications means for transmitting signals between the master and remote units;

remote processing means for combining said random number in said selected remote unit with said first and second secret numbers stored in said selected remote unit in said predetermined manner to generate a remote processed number;

master processing means for processing said random number in the master unit with said first and second secret numbers for said selected remote unit stored in the master unit in said predetermined manner to generate a master processed number; and comparison means for comparing said remote processed number and said master processed number in the master unit, whereby the identity of said selected remote unit is authenticated when said remote processed number is equal to said master processed number.

26. The system as claimed in claim 25, wherein said remote processing means and said master processing means comprise first combining means for combining said random number with said first secret number to produce an intermediate number and means for combining said intermediate number with said second secret number to produce said respective remote and master processed numbers.

27. The system as claimed in claim 26, wherein said first combining means in said selected remote and master units include means for exclusive OR-ing said random number with said first secret number.

28. The system as claimed in claim 26, wherein said second combining means in said selected remote and master units include encryption means for encrypting said intermediate number using said second secret number as an encrypting key.

29. The system as claimed in claim 28, wherein said encryption means uses DES encryption.

30. The system as claimed in claim 25, wherein said contact means comprises transmission means for transmitting an identification number from said selected remote unit to the master unit.

31. The system as claimed in claim 25, wherein said selected remote unit comprises a cellular telephone.

\* \* \* \* \*

UNITED STATES PATENT AND TRADEMARK OFFICE
CERTIFICATE OF CORRECTION

PATENT NO. : 5,517,567
DATED : May 14, 1996
INVENTOR(S) : Epstein

It is certified that error appears in the above-identified patent and that said Letters Patent is hereby corrected as shown below:

Column 7, line 64, "256" should read --$2^{56}$--.

Column 7, line 67, "256" should read --$2^{56}$--.

Signed and Sealed this

Thirteenth Day of August, 1996

Attest:

BRUCE LEHMAN

Attesting Officer    Commissioner of Patents and Trademarks